Sept. 13, 1966     H. L. WALKER     3,272,722
FRACTIONAL DISTILLATION PROCESS AND SYSTEM
CONTROL FOR MAXIMUM VAPOR LOAD
Filed April 18, 1962

INVENTOR.
H. L. WALKER
BY
Young & Quigg
ATTORNEYS

United States Patent Office 3,272,722
Patented Sept. 13, 1966

3,272,722
FRACTIONAL DISTILLATION PROCESS AND SYSTEM CONTROL FOR MAXIMUM VAPOR LOAD
Harry L. Walker, Bartlesville, Okla., assignor to Phillips Petroleum Company, a corporation of Delaware
Filed Apr. 18, 1962, Ser. No. 188,413
8 Claims. (Cl. 203—2)

This invention relates to the control of fractionation columns.

It is well known to separate fluid mixtures by the use of fractionation columns. Heat normally is supplied to the lower region of the column to vaporize liquid. The resulting vapors rise through the column and contact downflowing liquid. In order to obtain the greatest possible throughput in a given column, it is generally desirable to operate with the maximum vapor load which does not result in flooding of the column. Under this condition of maximum vapor load, the amount of reflux in the column which should be employed to obtain the best possible separation will vary with changes of feed flow and/or composition.

It has recently been discovered that the control of fractionation columns can be improved by computing and regulating the internal reflux in the column. Internal reflux constitutes the external reflux returned to the column plus the vapor which is condensed near the top of the column by subcooled external reflux. This internal reflux $R_i$ can be computed from the following equation:

$$R_i = R_e(1 + K\Delta T) \quad (1)$$

where $R_e$ is the external reflux returned to the column, $\Delta T$ is the difference between the temperatures of the overhead vapor and the external reflux, and K is equal to the specific heat of the liquid on the top tray divided by the heat of vaporization of liquid on the top tray. Apparatus which can be employed to solve this equation and to control fractionation columns in response thereto is described in detail in ISA Journal, June 1959, pages 34 et seq.

In accordance with the present invention, a method is provided for maintaining the maximum allowable vapor load in a fractionation column even though the feed volume and/or composition varies. Both the feed composition and flow rate are measured. From these measurements, the overhead product rate for a given separation is calculated and subtracted from the maximum allowable vapor load permitted in the column. This computation results in a determination of the internal reflux that should be employed in the column for the maximum allowable vapor load. The calculated maximum allowable internal reflux rate is then imposed on the column by manipulation of the set point of an internal reflux computer-controller. This provides the best possible separation, regardless of varying conditions of feed volume and composition.

Accordingly, it is an object of this invention to provide an improved procedure for controlling the operation of fractionation columns.

Another object is to provide a method of operating fractionation columns so as to obtain maximum throughput for any given separation.

A further object is to provide a system for adjusting the operation of fractionation columns in response to changes in feed flow rates and/or compositions.

Other objects, advantages and features of the invention should become apparent from the following detailed description, taken in combination with the accompanying drawing in which.

Figure 1:
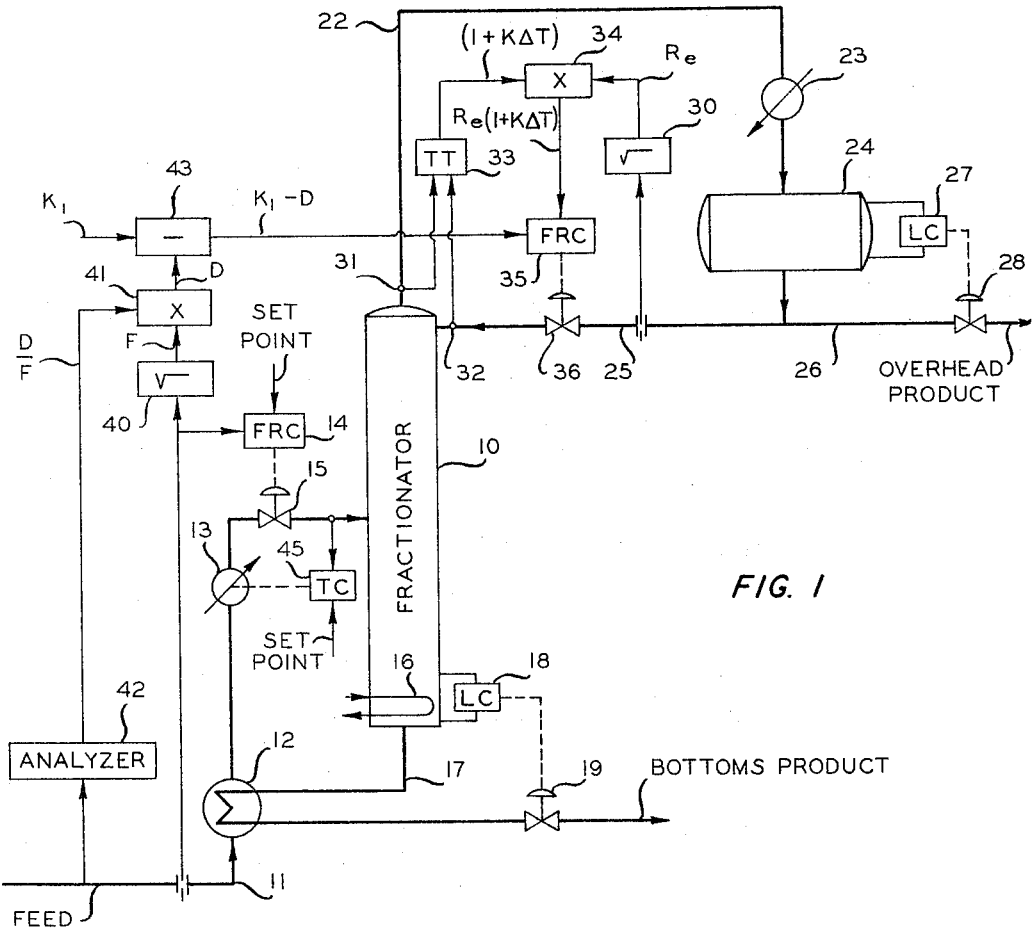
FIGURE 1 is a schematic representation of the fractionation control system of this invention.

Referring now to the drawing in detail and to FIGURE 1 in particular, there is shown a conventional fractionation column 10. A feed mixture to be separated is introduced into column 10 through a conduit 11 which communicates with a heat exchanger 12 and a heater 13. The rate of flow through conduit 11 can be regulated by a flow recorder-controller 14 which adjusts a valve 15. Heat is supplied to the lower region of column 10 by circulation of steam or other heating medium through a coil 16, or by use of an external reboiler. A kettle product stream is withdrawn from the bottom of column 10 through a conduit 17 which communicates with heat exchanger 12. The rate of kettle product withdrawal is regulated by a liquid level controller 18 which adjusts a valve 19 so as to maintain a predetermined liquid level in the bottom of column 10.

Vapors are withdrawn from the top of column 10 through a conduit 22 which has a condenser 23 therein. The resulting condensate is delivered to a reflux accumulator 24. A portion of this condensate is returned to column 10 through a conduit 25 to supply external reflux. The remainder of the condensate is removed through a conduit 26 as overhead product. A liquid level controller 27 on accumulator 24 adjusts a valve 28 in conduit 26 to maintain a predetermined liquid level in accumulator 24.

As previously mentioned, internal reflux can be computed from Equation 1. The term $R_e$ is established by applying a signal representative of the differential pressure across an orifice in conduit 25 through a square root extractor 30. The output signal from extractor 30 is thus representative of the rate of flow through conduit 25. Temperature sensing elements 31 and 32 are disposed in respective conduits 22 and 25 adjacent column 10. Output signals from these elements are applied to a temperature transducer 33 which provides an output signal representative of the quantity $(1 + K\Delta T)$. A conventional temperature transmitter with adjustable span and zero point can be employed for this purpose. The output signals from elements 30 and 33 are applied to a multiplier 34. The output signal from multiplier 34, which represents the computed internal reflux, is applied to a flow recorder-controller 35 which adjusts a valve 36 in conduit 25.

In order to explain the control system of this invention, an equation will be derived which represents the desired adjustment of the internal reflux. The vapor load V in the column can be expressed:

$$V = R_i + D \quad (2)$$

where $R_i$ is the internal reflux in the column and D is the overhead product. For any given separation system, there is a maximum V which must not be exceeded if flooding is to be avoided. This maximum V is designated $K_1$. Equation 2 can thus be rewritten:

$$K_1 - D = R_i' \quad (3)$$

where $R_i'$ is the internal reflux for $K_1$. Equation 3 can be rewritten:

$$R_i' = K_1 - F(D/F) \quad (4)$$

where F is the feed supplied to the column. Equation 4 is employed to compensate for changes in feed composition, as hereinafter described in greater detail. The term F is established by a square root extractor 40 which is connected across an orifice in conduit 11. The output signal of extractor 40 is applied to the first input of a multiplier 41. The term $D/F$ is established by an analyzer 42 which measures the composition of the feed. As previously noted, the term D represents those components of the feed mixture which form the desired overhead product. This value can be expressed in volume percent. A chromatographic analyzer can be employed, for example, to provide a series of output signals representing the concentration of each component of the feed. The signals representing the desired overhead components can be summed and divided by the sum of all of the output signals to give the term $D/F$. Either a digital computer or an analog computer with storage means can be employed for this purpose. While the output from such an analyzing means is not continuous, it can be converted to a continuous signal by a storage means which is reset each time a new analysis is made.

The output of analyzer 42 is applied to the second input of multiplier 41. The output signal D from multiplier 41 is applied to the input of a subtractor 43. The second input to subtractor 43 is a reference signal representative of $K_1$. This value can readily be determined experimentally for a given separation by increasing the vapor flow through the column until flooding occurs. The maximum vapor load which does not result in flooding is the set point value $K_1$. The output signal from subtractor 43 thus represents the maximum allowable internal reflux which can be employed in the column without flooding occurring, see Equation 3. This value is applied to the set point of internal reflux flow controller 35. Controller 35 adjusts the flow of external reflux as required to keep the computed internal reflux at the set point value established by subtractor 43.

Figure 2:
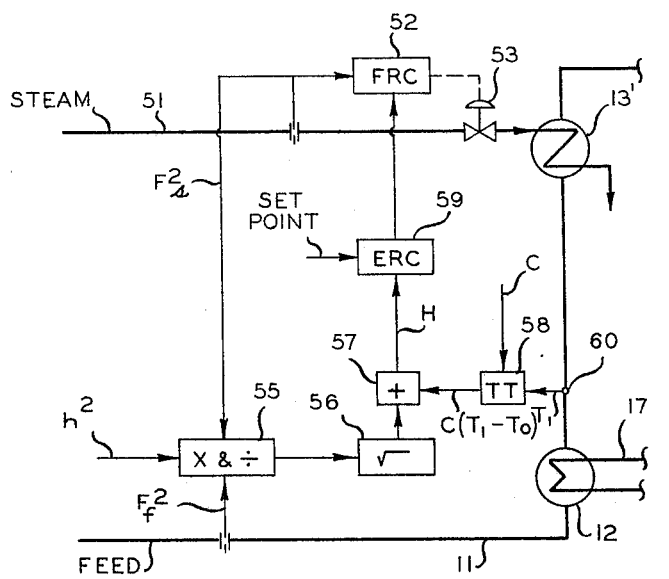
FIGURE 2 is a schematic view of a modification of the control system of FIGURE 1.

The equations thus far considered deal only with vapor load in the rectifying section of the fractionation column. However, these equations are also applicable where flooding occurs in the stripping section of the column, provided the feed enthalpy is maintained constant. Suitable apparatus which can be employed for this purpose is illustrated in FIGURE 2. Steam, or other heating medium is passed through heat exchanger 13′ by means of a conduit 51. The rate of flow of steam through conduit 51 is regulated by a flow recorder-controller 52 which adjusts a valve 53. In the event no feed vaporization takes place at or below temperature $T_1$, the total enthalpy H per unit volume or mass of the feed supplied to column 10 can be computed from the following equation:

$$H = C(T_1 - T_0) + \frac{F_s}{F_f} h \qquad (5)$$

where C is the average specific heat of the feed, $T_1$ is the temperature of the feed upstream from heat exchanger 13′, $T_0$ is an arbitrary reference temperature, $F_s$ is the rate of flow of steam through conduit 51, $F_f$ is the rate of flow of feed through conduit 11, and $h$ is the difference in enthalpy per unit volume or mass of the steam entering heat exchanger 13′ and the condensate removed therefrom.

A first signal is transmitted from an orifice in conduit 11 which is representative of the square $(F_f)^2$ of the rate of flow of feed through this conduit. This signal is applied to the first input of a multiplier and divider 55. A second signal representative of the square $(F_s)^2$ of the rate of flow of steam through conduit 51 is applied as a second input to multiplier and divider 55. A third set point signal representative of the quantity $h^2$ constitutes a third input to element 55. The output signal from element 55, which is representative of the quantity $$\left(\frac{F_s}{F_f} h\right)^2$$

is transmitted through a square root element 56 to the first input of an adder 57. A temperature transmitter 58 receives a first signal $T_1$ which is representative of the temperature of the feed upstream from heat exchanger 13′. A reference signal C is applied to the set point of transmitter 58 such that the output signal of this transmitter is representative of the quantity $C(T_1 - T_0)$. This output signal is applied as the second input to adder 57. The output signal from adder 57 is thus representative of the quantity H of Equation 5. This signal is applied to an enthalpy recorder-controller 59, the output of which adjusts the set point of flow recorder-controller 52. The desired enthalpy to be maintained for a given separation is applied to the set point of controller 59. Although not shown in FIGURE 2, the internal reflux computer and the set point adjusting apparatus are the same as in FIGURE 1.

In those operations where flooding does not occur in the rectifying section of the fractionator, the vapor load is measured or calculated that occurs in the rectifying section during the condition when flooding occurs in the stripping section. A value slightly below this selected value of the vapor load is chosen for the quantity $K_1$. This value for the vapor load may be considerably below the flood point in the rectifying section. However, at constant feed enthalpy, this selected value of $K_1$ is indicative of the condition in the stripping section where flooding actually occurs. The controller of FIGURE 2 is applicable when the feed is not vaporized. If the feed is partially vaporized, a computer of the type described in Industrial and Engineering Chemistry, vol. 53, No. 12, December 1961, page 966, can be employed.

The various computing elements employed in this invention can be conventional instruments well known to those skilled in the control art. The computations can be made by pneumatic or electrical instruments, for example.

As a specific example of the operation of this invention, reference is made to the separation of a hydrocarbon feed mixture. Typical separation conditions are as follows:

Temperature, top of column, ° F. _____ 167
Temperature, bottom of column, ° F. _____ 283
Temperature, returned external reflux, ° F. _____ 100
Pressure, top of column, p.s.i.g. _____ 135
Pressure, bottom of column, p.s.i.g. _____ 140
Vapor capacity of column, g.p.d. _____ 1,700,000

Stream Compositions:

| Component | Liquid Volume, Percent | Feed | Flow rates (g.p.d.) | |
|---|---|---|---|---|
| | | | Overhead Product | Kettle Product |
| $C_2$ | 1.0 | 10,760 | 10,760 | |
| $C_3$ | 20.0 | 215,190 | 215,190 | |
| $iC_4$ | 9.0 | 96,835 | 96,835 | |
| $nC_4$ | 28.0 | 301,265 | 300,000 | 1,265 |
| $iC_5$ | 12.0 | 129,115 | 1,265 | 127,850 |
| $nC_5$ | 13.0 | 139,875 | | 139,875 |
| $C_6+$ | 17.0 | 182,910 | | 182,910 |
| Total | 100.0 | 1,075,950 | 624,050 | 451,900 |

In this example, analyzer 42 provides an output signal equal to 58/100. The quantity D is 58, this being the total of the $C_2$, $C_3$, $iC_4$ and $nC_4$ components of the feed. It is desirable to recover the $C_4$ and lighter components in the overhead product. The quantity F from square root extractor 40 is proportional to 1,075,950 gallons per day. The quantity $K_1$ is proportional to 1,700,000 gallons per day. Thus, $K_1 - D$ is 1,075,949 gallons per day. The quantity $\Delta T$ is approximately (167−100) or 67. The quantity K is equal to 0.6/170. Under these conditions, $R_e$ is regulated so as to be approximately 870,178 gallons per day.

While this invention has been described in conjunction with presently preferred embodiments, it should be evident that it is not limited thereto.

What is claimed is:

1. In a fractionation system wherein a fluid mixture to be separated is introduced into a fractionation column, a kettle stream is withdrawn from the lower region of said column, a vapor stream is withdrawn from the upper region of said column, said vapor stream is cooled to condense same, a portion of the resulting condensate is returned to said column as external reflux, and the remainder of said condensate is removed as an overhead product stream; a control system comprising means to establish a first signal $R_e$ representative of the rate of flow of said external reflux; means to establish a second signal representative of the temperature of said vapor stream withdrawn from said column; means to establish a third signal representative of the temperature of said external reflux returned to said column; means responsive to said first, second and third signals to establish a fourth signal representative of the quantity $R_e(1+K\Delta T)$, where K is a constant and $\Delta T$ is the difference between said second and third signals; means to measure the rate of flow of said fluid mixture to said column and to establish a fifth signal F representative thereof; means to analyze the fluid mixture introduced into said column and to establish a sixth signal $(D/F)$ representative of the volume percent in said fluid mixture of the components thereof to be removed from said column as said vapor stream; means responsive to said fifth and sixth signals to establish a seventh signal representative of the quantity $(K_1-D)$, where $K_1$ is a constant representative of the maximum vapor load permitted without flooding occurring; a controller having an input, a set point and an output; means to apply said fourth signal to the input of said controller; means to apply said seventh signal to the set point of said controller; and means responsive to the output signal from said controller to adjust the rate of flow of said external reflux.

2. The control system of claim 1, further comprising means to regulate the enthalpy of said fluid mixture introduced into said column.

3. The control system of claim 2, wherein said means to regulate enthalpy comprises means to establish an eighth signal representative of the temperature of said feed mixture, a source of heat in heat exchange relationship with said feed mixture, means to establish a ninth signal representative of the rate said source of heat is added to said feed mixture, means responsive to said fifth and eighth and ninth signals to compute the enthalpy of said feed mixture, and means responsive to said means to compute to regulate the application of heat from said means to said feed mixture.

4. In a fractionation system wherein a fluid mixture to be separated is introduced into a fractionation column, a kettle stream is withdrawn from the lower region of said column, a vapor stream is withdrawn from the upper region of said column, said vapor stream is cooled to condense same, a portion of the resulting condensate is returned to said column as external reflux, and the remainder of said condensate is removed as an overhead product stream; a control system comprising means to establish a first signal $R_e$ representative of the rate of flow of said external reflux; means to establish a second signal representative of the temperature of said vapor stream withdrawn from said column; means to establish a third signal representative of the temperature of said external reflux returned to said column; means responsive to said first, second and third signals to establish a fourth signal representative of the quantity $R_e(1+K\Delta T)$, where K is a constant and $\Delta T$ is the difference between said second and third signals; means to establish a fifth signal F representative of the rate of flow of said fluid mixture to said column; an analyzer connected to the source of fluid mixture to said column, said analyzer establishing a sixth signal representative of the quantity $(D/F)$, where $(D/F)$ is the volume percent in said fluid mixture of the components thereof to be removed from said column as said overhead product stream; a source of reference signal $K_1$ which is representative of the maximum vapor load permitted without flooding occurring; means to mutiply said fifth signal by said sixth signal to establish a product signal D; means to subtract said product signal from said reference signal to establish a seventh signal $(K_1-D)$; means to compare said fourth and seventh signals; and means responsive to said means to compare to adjust the rate of flow of said external reflux.

5. In a fractionation system wherein a fluid mixture to be separated is introduced into a fractionation column, a kettle stream is withdrawn from the lower region of said column, a vapor stream is withdrawn from the upper region of said column, said vapor stream is cooled to condense same, a portion of the resulting condensate is returned to said column as external reflux, and the remainder of said condensate is removed as an overhead product stream; a system to control the rate of flow of external reflux to said column to permit a maximum vapor load in said column comprising means to establish a first signal F representative of the flow of said fluid mixture to said column; an analyzer connected to the source of fluid mixture to said column, said analyzer establishing a second signal representative of the quantity $(D/F)$, where $(D/F)$ is the volume percent in said fluid mixture of the components thereof to be removed from said column as said overhead product; a source of a reference signal $K_1$, where $K_1$ represents the maximum vapor flow in said column to avoid flooding; means to multiply said second signal by said first signal to establish a product signal D; means to subtract said product signal from said reference signal to establish a signal $(K_1-D)$ which is representative of said reflux; and means responsive to said signal $(K_1-D)$ to adjust the rate of flow of said external reflux.

6. In a fractionation process wherein a fluid mixture to be separated is introduced into a fractionation zone, a kettle product stream is withdrawn from the lower region of said zone, a vapor stream is withdrawn from the upper region of said zone, said vapor stream is cooled to condense same, a portion of the resulting condensate is returned to said zone as external reflux, and the remainder of said condensate is removed as an overhead product stream; a control method comprising establishing a first signal $R_e$ which is representative of the rate of flow of the external reflux; establishing a second signal which is representative of the temperature of the vapor stream withdrawn from said zone; establishing a third signal which is representative of the temperature of the external reflux returned to said zone; combining said first, second and third signals so as to establish a fourth signal which is representative of the quantity $R_e(1+K\Delta T)$, where K is the specific heat of the liquid in the top of said zone divided by the heat of vaporization of liquid in the top of said zone and $\Delta T$ is the difference between the second and third signals; measuring the rate of flow of the feed mixture to said zone and establishing a fifth signal F which is representative thereof; measuring the composition of the feed mixture and establishing a sixth signal $(D/F)$ which is representative of the volume percent in the fluid mixture of the components therein to be removed from said zone as said vapor stream; combining said fifth and sixth signals so as to establish a seventh signal which is representative of the quantity $(K_1-D)$, where $K_1$ is the maximum vapor load capacity of said zone which does not result in flooding; and adjusting the rate of flow of the external reflux in response to a comparison of the fourth and seventh signals so as to maintain said fourth signal equal to said seventh signal.

7. The method of claim 6, further comprising the step of regulating the temperature of the feed mixture introduced into said fractionation zone.

8. In a fractionation process wherein a fluid mixture to be separated is introduced into a fractionation zone, a kettle product stream is withdrawn from the lower region of said zone, a vapor stream is withdrawn from the upper region of said zone, said vapor stream is cooled to condense same, a potion of the resulting condensate is returned to said zone as external reflux, and the remainder of said condensate is removed as an overhead product stream; a method of controlling the reflux to be employed in said zone to permit a maximum vapor load which comprises establishing a first signal F which is representative of the flow of the fluid mixture to said zone; measuring the composition of the feed mixture and establishing a second signal which is representative of the quantity $(D/F)$, where $(D/F)$ is the volume percent in the fluid mixture of the components therein to be removed from said zone as said overhead product stream; multiplying the second signal by the first signal to establish a product signal D; subtracting the product signal D from a reference signal $K_1$ to establish a control signal which is representative of the maximum vapor load capacity of said zone which does not result in flooding; and adjusting the rate of flow of said external reflux in response to said control signal.

References Cited by the Examiner

UNITED STATES PATENTS

| 2,985,565 | 5/1961 | Bellinger | 202—160 |
| 2,994,643 | 8/1961 | Smalling | 202—160 |
| 3,018,229 | 1/1962 | Morgan | 202—160 |
| 3,020,213 | 2/1962 | Lupfer | 202—160 |

FOREIGN PATENTS 1,177,743  12/1958  France.

OTHER REFERENCES

Lupfer et al.: "Industrial and Engineering Chemistry," vol. 53, No. 12, December 1961, pp. 966–968.

Anisimov: "Automatic Control of Rectification Processes," Moscow, 1957. Translated by Consultants Bureau, Inc., New York, 1959, pp. 26 and 27 of translation.

NORMAN YUDKOFF, *Primary Examiner.*

GEORGE D. MITCHELL, *Examiner.*

W. L. BASCOMB, M. H. SILVERSTEIN,
*Assistant Examiners.*